United States Patent [19]
Cole et al.

[11] Patent Number: 6,023,830
[45] Date of Patent: Feb. 15, 2000

[54] APPARATUS AND METHOD FOR INSTALLING A NOISE REDUCTION STRUCTURE WITHIN A VEHICLE DRIVESHAFT TUBE

[75] Inventors: David Alvin Cole, Swanton; Kellie L. Stevens, Holland, both of Ohio; Earl L. Brazle, Whitleyville, Tenn.; Tyrone L. Bowman, Gainesboro, Tenn.; Eric K. Manning, Gordonsville, Tenn.; James G. Koedam, Olathe, Kans.

[73] Assignee: Dana Corporation, Toledo, Ohio

[21] Appl. No.: 09/099,180

[22] Filed: Jun. 18, 1998

[51] Int. Cl.[7] .................................................. B23Q 17/00
[52] U.S. Cl. .......................................... 29/407.01; 29/452
[58] Field of Search ....................... 29/451, 452, 890.08, 29/407.09, 407.01, 421.1; 53/510, 284.5

[56] References Cited

U.S. PATENT DOCUMENTS

| | | |
|---|---|---|
| 2,001,166 | 5/1935 | Swennes . |
| 2,260,237 | 10/1941 | Stahl ........................................ 15/326 |
| 2,353,174 | 7/1944 | McLaughlin . |
| 2,751,765 | 6/1956 | Rowland et al. . |
| 2,761,296 | 9/1956 | Baker ....................................... 464/180 |
| 2,929,462 | 3/1960 | Nowak .................................... 181/252 |
| 3,075,406 | 1/1963 | Butler, Jr. et al. ...................... 188/268 |
| 3,145,464 | 8/1964 | Green . |
| 3,840,966 | 10/1974 | Reid et al. . |
| 4,014,184 | 3/1977 | Stark ....................................... 188/1 B |
| 4,015,683 | 4/1977 | Williams ................................ 181/36 R |
| 4,570,323 | 2/1986 | Legerius et al. ........................... 29/451 |
| 4,844,193 | 7/1989 | Veselica et al. ......................... 464/180 |
| 4,909,361 | 3/1990 | Stark et aL. . |
| 5,326,324 | 7/1994 | Hamada .................................. 464/180 |
| 5,904,622 | 5/1999 | Breese et al. ........................... 464/180 |

*Primary Examiner*—David P. Bryant
*Assistant Examiner*—Jermie E. Cozart
*Attorney, Agent, or Firm*—MacMillan, Sobanski & Todd, LLC

[57] ABSTRACT

A method for installing a noise reduction structure within a vehicle driveshaft tube includes the initial step of disposing a reducing sleeve adjacent to a first end of the driveshaft tube. The reducing sleeve may define an inner surface that is tapered from a first diameter, which is slightly larger than the uncompressed outer diameter of the noise reduction structure, to a second diameter, which is approximately equal to the diameter of the first end of the driveshaft tube. Alternatively, the reducing sleeve may define an inner surface that is tapered from a first diameter and then rounded to a second diameter. A source of vacuum is disposed adjacent to a second end of the driveshaft tube, opposite the first end. The source of vacuum may be an accumulator tank and compressor assembly or a venturi arrangement. In any event, the noise reduction structure is disposed within the reducing sleeve and a vacuum is generated such that the vacuum draws the noise reduction structure into the driveshaft tube. To control the position of the noise reduction structure within the driveshaft tube, a limit switch can be positioned at a desired location within the driveshaft tube. When the leading end of the noise reduction structure touches the limit switch, the vacuum may be vented to the atmosphere, thereby preventing further movement of the noise reduction structure. Once installed within the driveshaft tube, the noise reduction structure expands outwardly into a light interference fit therewith. If desired, several methods are proposed to increase the force exerted on the noise reduction structure by the source of vacuum.

18 Claims, 7 Drawing Sheets

APPARATUS AND METHOD FOR INSTALLING A NOISE REDUCTION STRUCTURE WITHIN A VEHICLE DRIVESHAFT TUBE

BACKGROUND OF THE INVENTION

This invention relates in general to vehicle driveshaft assemblies containing a structure for reducing the amount of noise generating by the driveshaft during operation. In particular, this invention relates to an improved apparatus and method of installing such a noise reduction structure within a driveshaft tube of a vehicle driveshaft assembly.

Torque transmitting shafts are widely used for transferring rotational power between a source of rotational power and a rotatably driven mechanism. An example of a torque transmitting shaft is a driveshaft tube used in a vehicle driveshaft assembly. The driveshaft assembly transmits rotational power from a source, such as an engine, to a driven component, such as a pair of wheels. A typical vehicle driveshaft assembly includes a hollow cylindrical driveshaft tube having an end fitting secured to each end thereof. Usually, the end fittings are embodied as end yokes that are adapted to cooperate with respective universal joints. For example, a driveshaft assembly of this general type is often used to provide a rotatable driving connection between the output shaft of a vehicle transmission and an input shaft of an axle assembly for rotatably driving the vehicle wheels.

One problem encountered in driveshaft assemblies and other rotatable structures is that they tend to produce and transmit undesirable sounds during operation. It is known that all mechanical bodies have a natural resonant frequency at which they tend to vibrate when operated at certain rotational speeds. This natural resonant frequency is an inherent characteristic of the mechanical body and is based upon many factors, including its composition, size, and shape. In the context of vehicular driveshaft assemblies, the rotational velocity of the driveshaft tube can be operated at or near its natural resonant frequency (or one or more of the harmonics thereof) when the vehicle is in motion. When this occurs, the driveshaft tube may begin to vibrate, causing the generation of undesirable noise. Thus, it would be advantageous to deaden or reduce the sound produced by a vehicle driveshaft assembly in order to provide the passengers with a more quiet and comfortable ride.

Various attempts have been made to reduce the sounds generated by vehicle driveshaft tubes during operation. For example, it has been found to be desirable to dispose one or more noise reduction structures within the hollow driveshaft tube to absorb some of the noise generated during use. Known noise reduction structures have been manufactured from many materials, including cardboard, foam, and the like. Frequently, the noise reduction structure engages the inner surface of the driveshaft tube in a relatively light press-fit engagement to prevent it from moving therein during use, yet facilitating the installation thereof. In the past, the noise reduction structures have been installed within the driveshaft tubes by disposing the leading end thereof adjacent an open end of the driveshaft tube and applying a force to the trailing end thereof to push it through the open end and into driveshaft tube. This method has been found to be relatively slow and inefficient, particularly in the context of the relatively high volume production requirements associated with the manufacture of vehicles and vehicle components. This method has also been found to be difficult to implement when the ends of the driveshaft tube have a smaller diameter than the central portion thereof.

Thus, it would be desirable to provide an improved method for quickly and easily installing a noise reduction structure within a driveshaft tube of a vehicular driveshaft assembly.

SUMMARY OF THE INVENTION

This invention relates to an improved apparatus and method for quickly and easily installing a noise reduction structure within a driveshaft tube of a vehicular driveshaft assembly. A reducing sleeve is disposed adjacent to a first end of the driveshaft tube. The reducing sleeve may be a cone-shaped sleeve defining an inner surface that is tapered from a first diameter, which is slightly larger than the uncompressed outer diameter of the noise reduction structure, to a second diameter, which is approximately equal to the diameter of the first end of the driveshaft tube. A source of vacuum is disposed adjacent to a second end of the driveshaft tube. The source of vacuum may be an accumulator tank and compressor assembly or a venturi arrangement. In any event, the noise reduction structure is disposed within the reducing sleeve such that the vacuum draws it through the reducing sleeve and into the driveshaft tube. The method may further include the step of determining whether the noise reduction structure has reached a predetermined location within the driveshaft tube. This can be achieved by providing a limit switch that may be inserted through the second end of the driveshaft tube to a desired location. When the leading end of the noise reduction structure touches the limit switch, the vacuum can then be vented to the atmosphere, thus preventing further movement of the noise reduction structure. Further, the method may also include the step of providing a permeability reducing device to the leading end of the noise reduction structure to increase the amount of force exerted by the source of vacuum on the noise reduction structure. The permeability reducing device may comprise a gripping tool having a plug and a plurality of gripping fingers, an end cap that fits over the noise reduction structure, or an end portion integral with the noise reduction structure.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
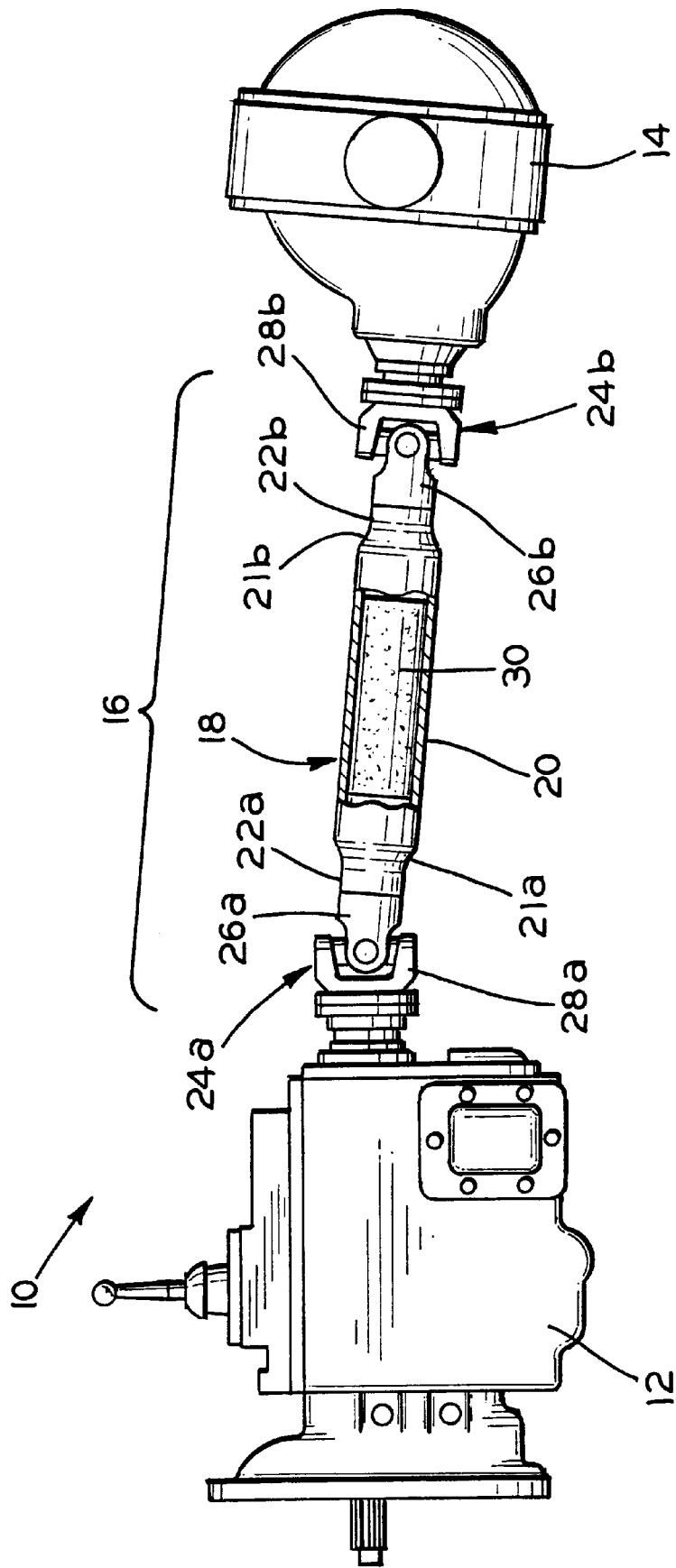
FIG. 1 is a schematic sectional elevational view, partially broken away, of a prior art vehicle drive train including a driveshaft tube containing a noise reduction structure.

Referring now to the drawings, there is illustrated in FIG. 1 a vehicle drive train assembly, indicated generally at 10, that is conventional in the art. The drive train assembly 10 includes a transmission 12 having an output shaft (not shown) that is connected to an input shaft (not shown) of an axle assembly 14 through a driveshaft assembly 16. The transmission 12 is rotatably driven by an engine (not shown) that generates rotational power in a conventional manner. The driveshaft assembly 16 includes a cylindrical driveshaft tube, indicated generally at 18, having a center portion 20 and a pair of opposed end portions 22a and 22b. In the illustrated embodiment, the center portion 20 of the driveshaft tube 18 is formed having a larger outer diameter than either of the end portions 22a and 22b. Thus, transition regions 21a and 21b are defined between the larger diameter center portion 20 of the illustrated driveshaft tube 18 and each of the smaller diameter end portions 22a and 22b thereof. However, the driveshaft tube 18 may be formed having a constant diameter throughout the length thereof or any other desired shape.

The output shaft of the transmission 12 and the input shaft of the axle assembly 14 are typically not co-axially aligned. To accommodate this, a pair of universal joints, indicated generally at 24a and 24b, are provided at the end portions 22a and 22b of the driveshaft tube 18 to respectively connect the driveshaft tube 18 to the output shaft of the transmission 12 and to the input shaft of the axle assembly 14. The first universal joint 24a includes a tube yoke 26a that is secured to the forward end portion 22a of the driveshaft tube 18 by any conventional means, such as by welding. The first universal joint 24a further includes an end yoke 28a that is connected to the output shaft of the transmission 12. Similarly, the second universal joint 24b includes a tube yoke 26b that is secured to the rearward end portion 22b of the driveshaft tube 18 by any conventional means, such as by welding. The first universal joint 24b further includes an end yoke 28b that is connected to the input shaft of the axle assembly 14.

To reduce the amount of undesirable noise generated by the driveshaft tube 18 during use, a noise reduction structure 30 is disposed within the driveshaft tube 18. The noise reduction structure 30 is conventional in the art and may be formed from any material that tends to reduce the amount of noise generated by the driveshaft tube 18 when it is rotated during use. For example, the noise reduction structure 30 may be formed from a polyether material, such as a polyurethane foam, having density of approximately 1.5 lb/ft³. The noise reduction structure 30 may be formed generally in the shape of a cylinder having an outer surface that defines a diameter that is slightly larger than an inner diameter defined by the center portion 20 or end portions 22a and 22b of the driveshaft tube 18. Thus, when the noise reduction structure 30 is disposed within the driveshaft tube 18, a light press fit engagement is established therebetween to prevent relative movement from occurring during operation. However, the noise reduction structure 30 may be retained in position within the driveshaft tube 18 after installation by any other conventional means, such as mechanically or by an adhesive, or alternatively may not be restrained in a predetermined position at all.

Figure 2:
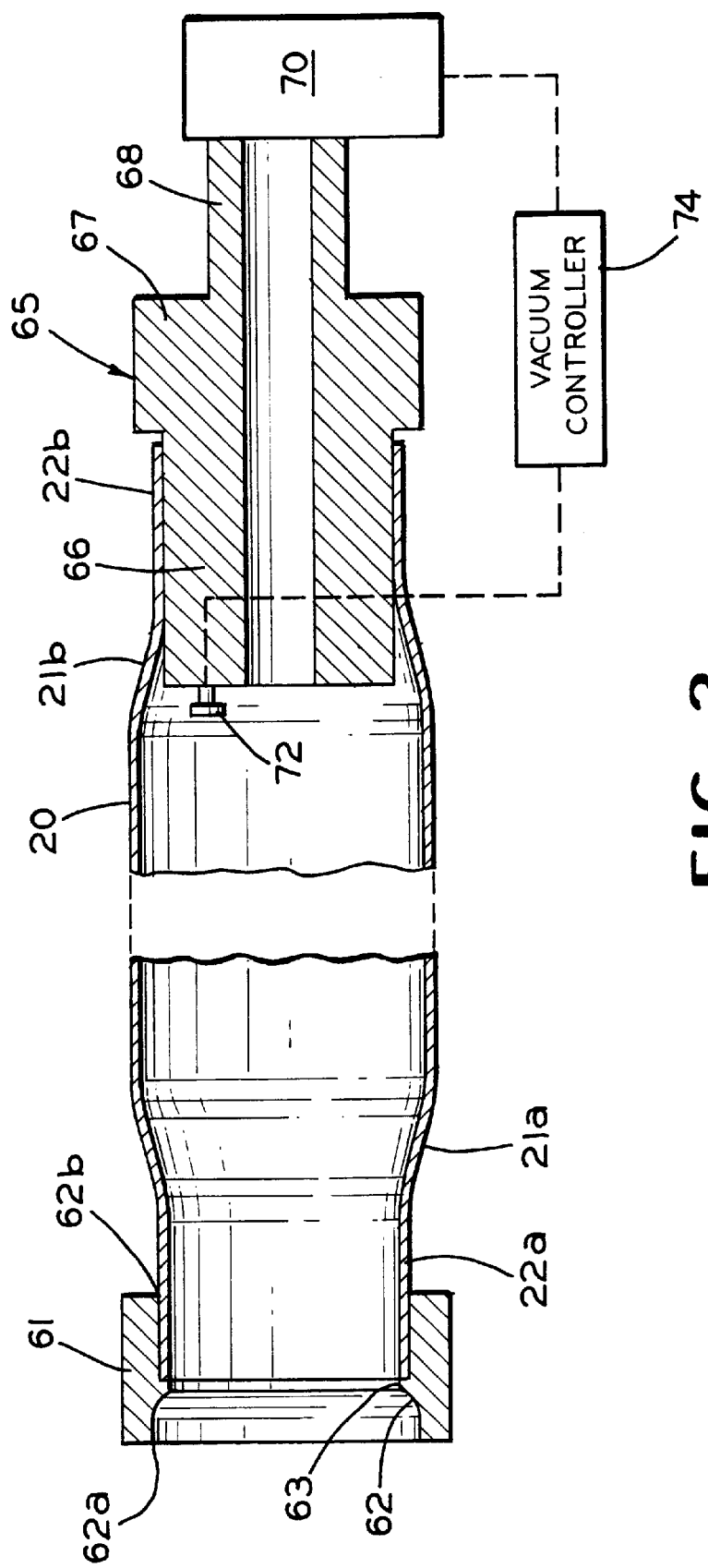
FIG. 2 is a sectional elevational view of a first embodiment of an apparatus for installing the noise reduction structure within the driveshaft tube as shown in FIG. 1.

Referring now to FIG. 2, there is illustrated a first embodiment of an apparatus for installing the noise reduction structure 30 within the driveshaft tube 18 in accordance with this invention. The apparatus includes a hollow reducing sleeve 61 that is positioned adjacent one of the end portions 22a or 22b of the driveshaft tube 18. Preferably, the reducing sleeve 61 is a generally cylindrical body having an inner surface 62 that is tapered, curved, otherwise shaped to extend from a first end 62a defining a relatively larger inner diameter to a second end 62b defining a relatively smaller diameter. In the illustrated embodiment, the inner surface 62 is generally arcuately shaped having a relatively small radius of curvature. However, the inner surface 62 may be formed having any desired shape.

Preferably, the relatively smaller diameter defined by the second end 62b of the inner surface 62 is slightly larger than the outside diameter of the end portion 22a of the driveshaft tube 18. Thus, the end portion 22a of the driveshaft tube 18 can be inserted telescopically within the second end 62b of the reducing sleeve 61, as shown in FIG. 2. If desired, a small circumferential lip 63 or other inwardly extending protrusion may be formed on the inner surface 62 of the reducing sleeve 61. The lip 63 can be provided to positively position the first end portion 22a of the driveshaft tube 18 therein. Also, the lip 63 can be formed having an inner diameter that is approximately equal to (or slightly smaller than) the inner diameter of the first end portion 22a of the driveshaft tube 18 to provide a flush surface therewith, for a purpose that will become apparent below.

The apparatus further includes a vacuum nozzle, indicated generally at 65, that is positioned adjacent the opposite end portion 22b of the driveshaft tube 18. The vacuum nozzle 65 includes a first end portion 66 that is preferably shaped complementary to the shape of the second end portion 22b of the driveshaft tube 18. Thus, the illustrated first end portion 66 of the vacuum nozzle 65 is generally cylindrical in shape, defining an outer diameter that is slightly smaller than the inner diameter of the second end portion 22b of the driveshaft tube 18. The illustrated vacuum nozzle 65 further includes an enlarged central portion 67 that engages the second end portion 22b of the driveshaft tube 18 in a relatively air-tight manner and to positively position the second end portion 22b of the driveshaft tube 18 thereon. If desired, one or more conventional seals (not shown) may be provided to insure a relatively air-tight connection between the vacuum nozzle 65 and the driveshaft tube 18. The vacuum nozzle 65 further includes a second end portion 68 that is formed in any conventional manner to facilitate the connection of the vacuum nozzle 65 to a conventional source of vacuum 70.

The vacuum nozzle 65 may also, if desired, include a structure for selectively operating the source of vacuum 70. In the illustrated embodiment, a limit switch 72 is provided on the first end portion 66 of the vacuum nozzle 65. The limit switch 72 is conventional in the art and is adapted to generate an electrical signal when it is physically engaged by an article. The limit switch 72 can be connected directly to the source of vacuum 70 or through a vacuum controller 74 to operate the source of vacuum 70. In the latter instance, the vacuum controller 74 can be embodied as any control device (such as a mechanical switch or an electronic microprocessor, for example) that enables the source of vacuum 70 to operate when the limit switch 72 is not engaged by an article. However, when the limit switch 72 is engaged by an article, such as in the manner described below, the source of vacuum 70 is disabled from operation.

Figure 3:
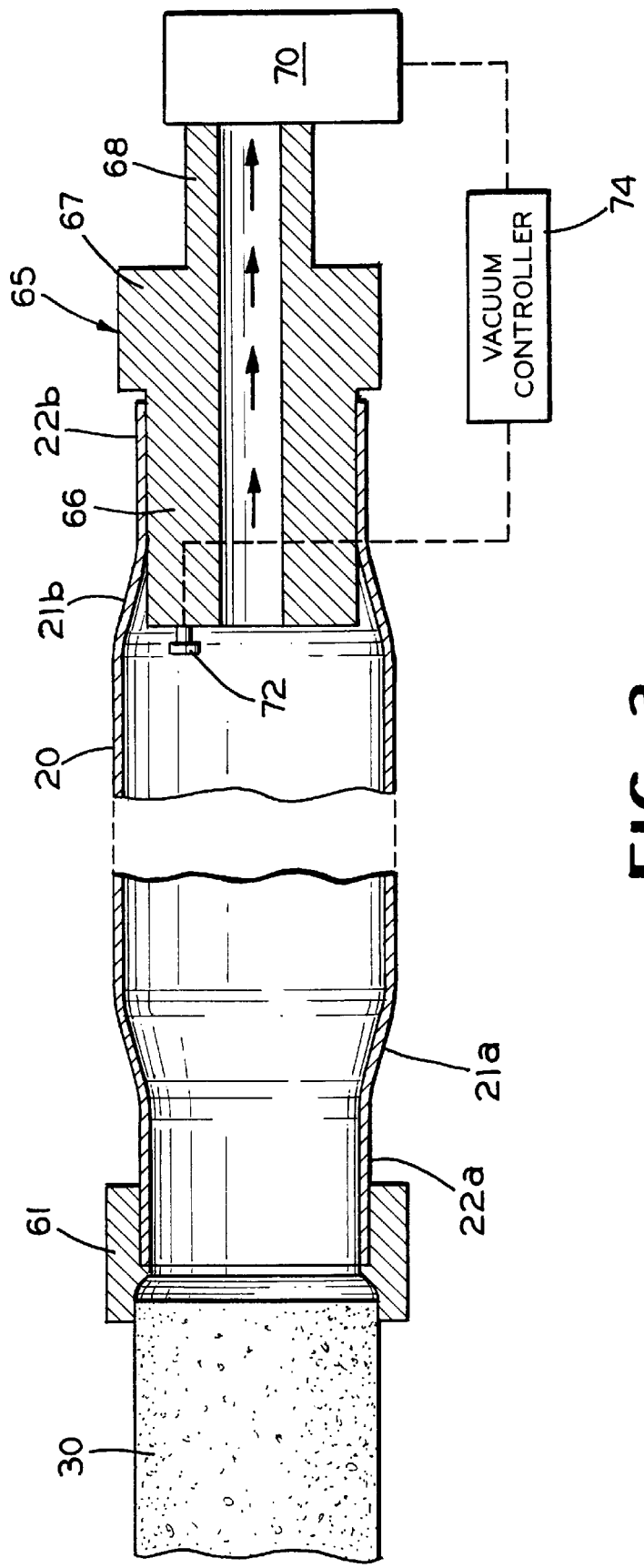
FIG. 3 is a sectional elevational view similar to FIG. 2 showing the noise reduction structure prior to installation within the driveshaft tube.
Figure 4:
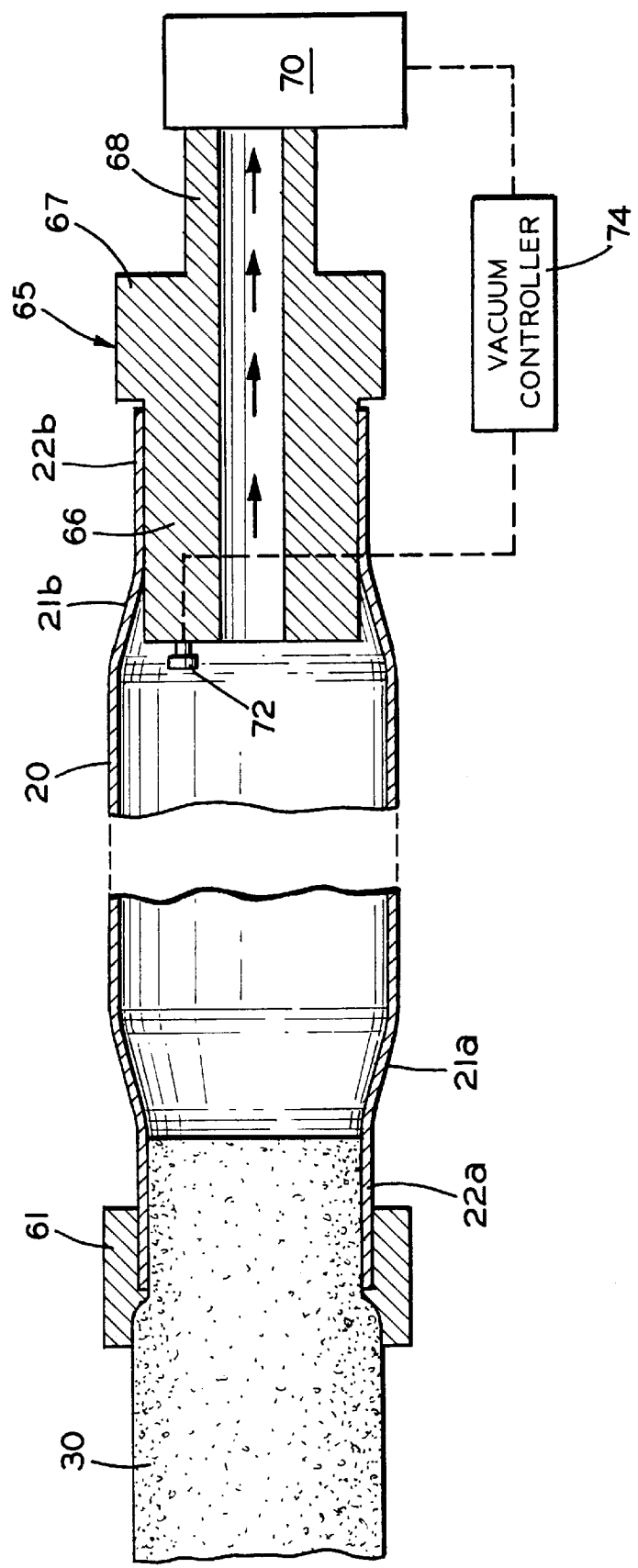
FIG. 4 is a sectional elevational view similar to FIG. 2 showing the noise reduction structure partially installed within the driveshaft tube.
Figure 5:
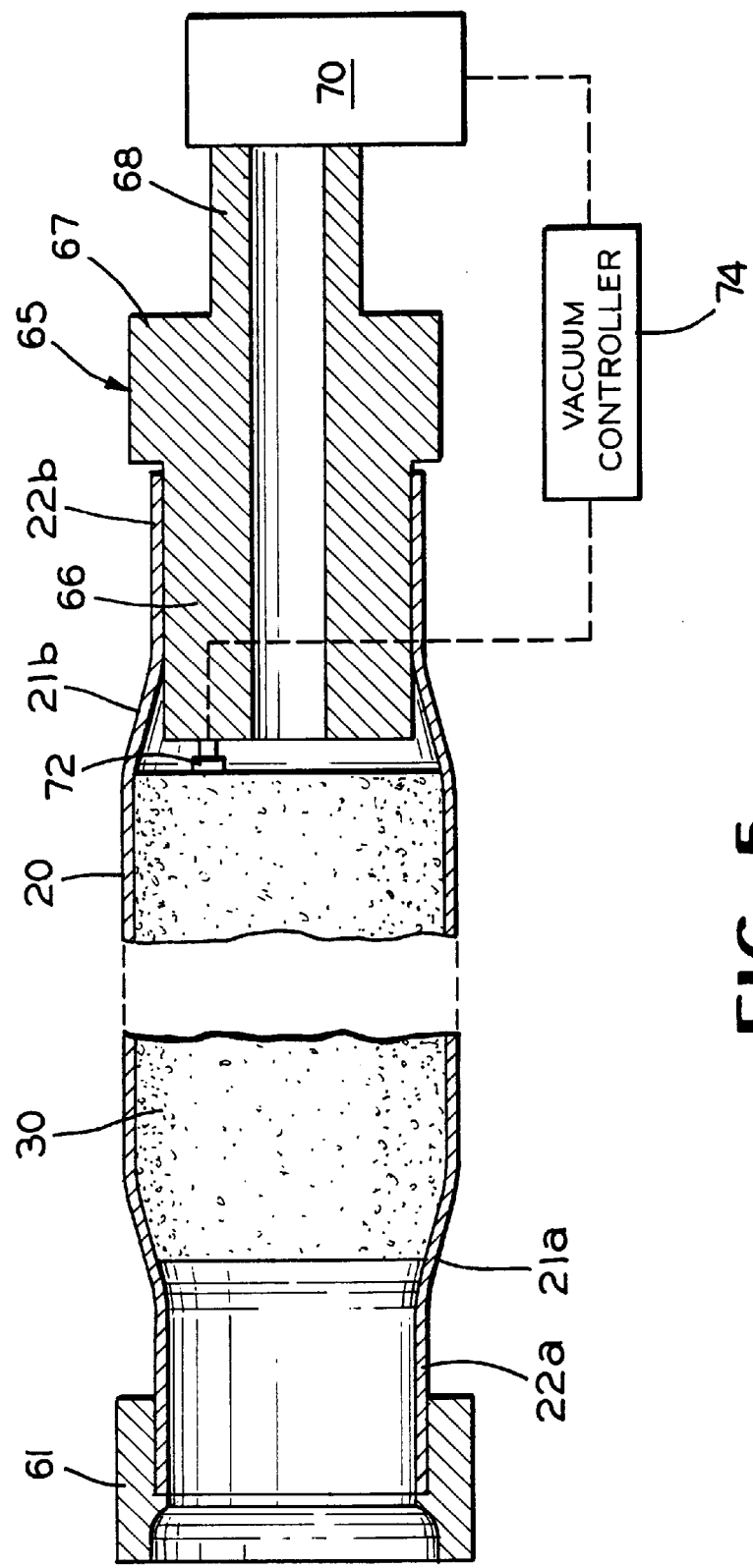
FIG. 5 is a sectional elevational view similar to FIG. 4 showing the noise reduction structure fully installed within the driveshaft tube.

The method of installing the noise reduction structure 30 within the driveshaft tube 18 will now be described. Initially, as shown in FIG. 2, the reducing sleeve 61 and the vacuum nozzle 65 are positioned adjacent the two end portions 22a and 22b of the driveshaft tube 18. Then, the noise reduction structure 30 is positioned such that one end thereof is disposed adjacent to the reducing sleeve 61, as shown in FIG. 3. Once the noise reduction structure 30 has been so positioned, the source of vacuum 70 is operated to create a vacuum within the driveshaft tube 18, as indicated by the arrows within the vacuum nozzle 65. The pressure differential created by the vacuum within the driveshaft tube 18 causes the noise reduction structure 30 to be drawn axially inwardly, as shown in FIG. 4. Such movement of the noise reduction structure 30 continues until the leading edge thereof engages the limit switch 72, as shown in FIG. 5. At that time, the limit switch 72 generates a signal to the vacuum controller 74, causing the source of vacuum 70 to cease operation. As a result, the noise reduction structure 30 is positioned within the driveshaft tube 18 for operation.

It will be appreciated that the location of the noise reduction structure 30 relative to the driveshaft tube 18 can be predetermined by properly positioning the limit switch 72 for engagement at the proper location. Alternatively, the source of vacuum 70 can be operated manually or controlled in any other manner (such as by a timer, for example) to position the noise reduction structure 30 at a desired location relative to the driveshaft tube 18. It may be desirable to provide a structure for venting the interior of the driveshaft tube 18 when the source of vacuum 70 is turned off to facilitate the removal thereof.

As mentioned above, the reducing sleeve 61 is provided to compress the outer diameter of the noise reduction structure 30 to be approximately equal to the inside diameter of the end portion 22a of the driveshaft tube 18. Thus, the specific shape of the inner surface 62 of the reducing sleeve 61 may be varied as desired to accomplish this result. The use of the reducing sleeve 61 has been found to be desirable to facilitate the insertion of the noise reduction structure 30 within the driveshaft tube 18 when the relaxed outer diameter of the noise reduction structure 30 is larger than the inner diameter of the end portion 22a of the driveshaft tube 18. However, it will be appreciated that this invention may be practiced without the reducing sleeve 61 if the noise reduction structure 30 can be directly inserted within the driveshaft tube 18 under the influence of the vacuum. For example, in some instances, such as when the end portion 22a is not smaller in diameter than the central portion of the driveshaft tube 18, the use of the reducing sleeve 61 may not be necessary.

The amount of vacuum necessary to draw the noise reduction structure 30 into the driveshaft tube 18 will vary with many factors, including the relative hardness of the noise reduction structure 30, the relative size differential between the noise reduction structure 30 and the end portion 22a of the driveshaft tube 18, the relative permeability of the noise reduction structure 30 to the flow of air therethrough, and other factors. For instance, it has been found to be acceptable for the source of vacuum 70 to generate approximately negative 25 Hg of vacuum to draw a noise reduction structure 30 formed from the above-described material within the driveshaft tube 18.

Figure 6:
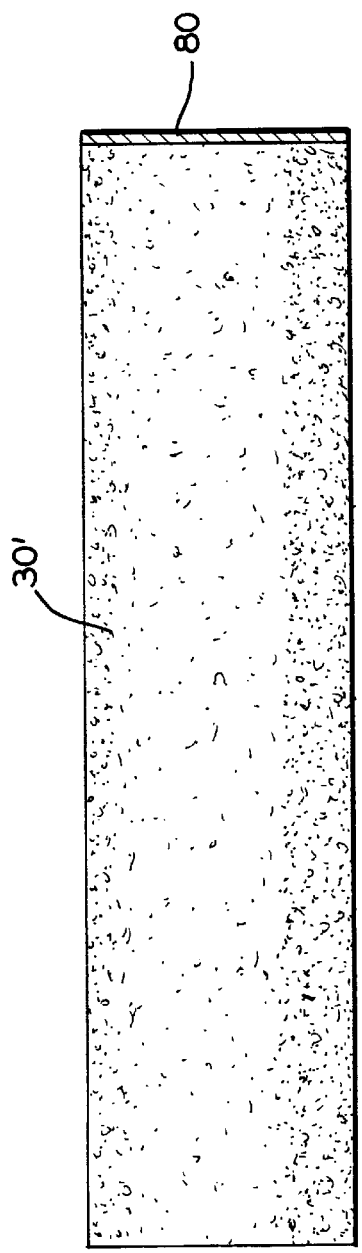
FIG. 6 is a sectional elevational view of a first alternative embodiment for the noise reduction structure that can be used with the apparatus illustrated in FIGS. 2 through 5.

In some instances, the noise reduction structure 30 may be too permeable to the flow of air therethrough to create a sufficient pressure differential to draw it within the driveshaft tube 18. FIG. 6 discloses a first alternative embodiment for the noise reduction structure 30' that can be used with the apparatus illustrated in FIGS. 2 through 5. As shown therein, the noise reduction structure 30' has a barrier piece 80 connected or otherwise secured to at least a portion of the leading edge thereof. The barrier piece 80 is formed from a material that is preferably less permeable to the flow of air therethrough than the noise reduction structure 30'. As a result, the source of vacuum 70 can generate a sufficient pressure differential to draw the noise reduction structure 30' within the driveshaft tube 18. The barrier piece 80 may be formed from any desired material and may, if desired, cover less than the entire leading edge of the noise reduction structure 30'. The barrier piece 80 may alternatively be connected or otherwise secured a different portion of the noise reduction structure 30' than the leading edge thereof.

Figure 7:
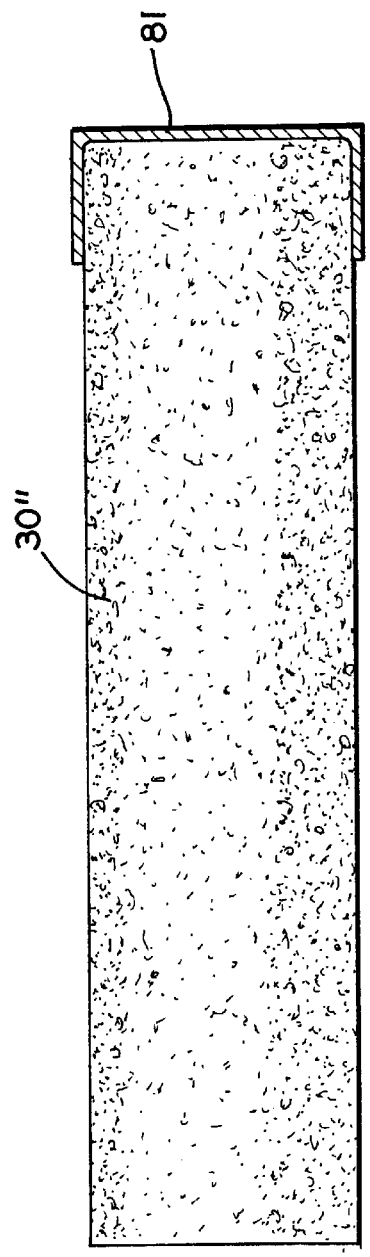
FIG. 7 is a sectional elevational view of a second alternative embodiment for the noise reduction structure that can be used with the apparatus illustrated in FIGS. 2 through 5.

FIG. 7 discloses a second alternative embodiment for the noise reduction structure 30" that can be used with the apparatus illustrated in FIGS. 2 through 5. As shown therein, the noise reduction structure 30" has a barrier cup 81 connected or otherwise secured to at least a portion of the leading edge thereof and about at least a portion of the outer surface thereof. The barrier cup 81 is formed from a material that is preferably less permeable to the flow of air therethrough than the noise reduction structure 30". As a result, the source of vacuum 70 can generate a sufficient pressure differential to draw the noise reduction structure 30" within the driveshaft tube 18. The barrier cup 81 may be formed from any desired material and may, if desired, cover less than the entire leading edge and/or outer surface of the noise reduction structure 30".

Figure 8:
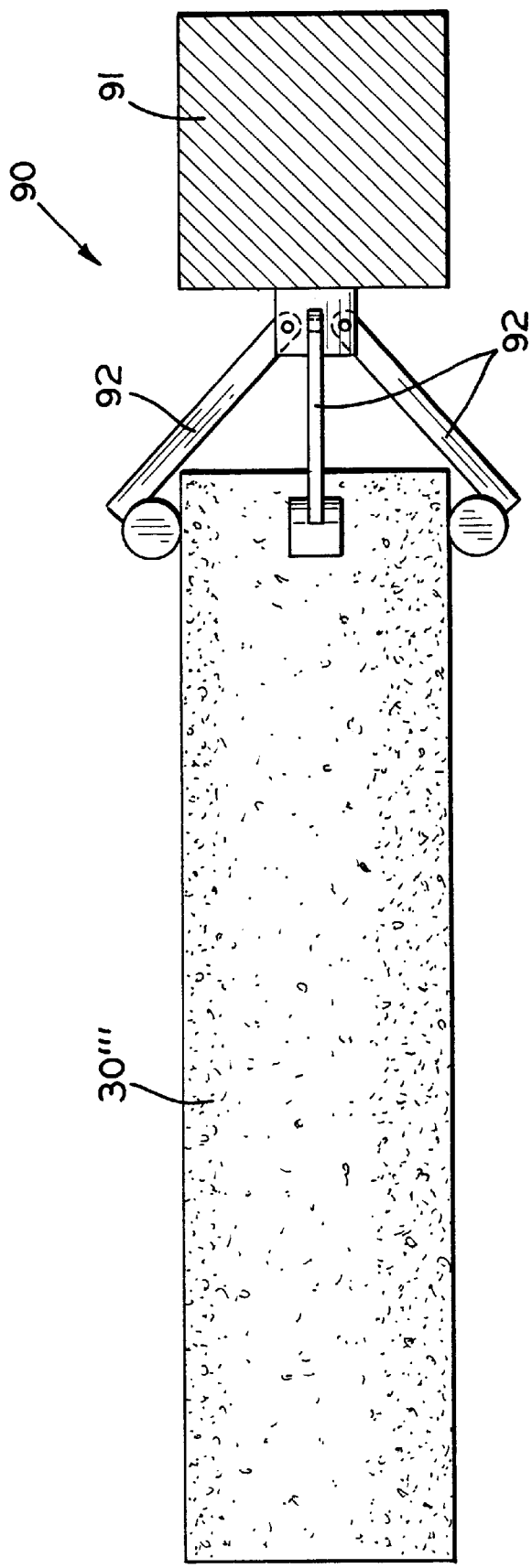
FIG. 8 is a sectional elevational view of a third alternative embodiment for the noise reduction structure that can be used with the apparatus illustrated in FIGS. 2 through 5.

FIG. 8 discloses a third alternative embodiment for the noise reduction structure 30''' that can be used with the apparatus illustrated in FIGS. 2 through 5. As shown therein, the body of the noise reduction structure 30''' has the same structure as illustrated in FIGS. 1 through 5. However, the noise reduction structure 30''' further includes a gripping device, indicated generally at 90, that is connected to the noise reduction structure 30'''. The illustrated gripping device 90 includes a plug 91 having a plurality of gripping fingers 92 extending therefrom. The plug 91 is formed from a material that is preferably less permeable to the flow of air therethrough than the noise reduction structure 30'''. The gripping fingers 92 are adapted to engage (frictionally as shown or otherwise) the noise reduction structure 30''' for movement therewith. The illustrated gripping fingers 92 are pivotably connected to the plug 91 so as to collapse inwardly when drawn through the reducing sleeve 61 as described above, although such is not necessary. Preferably, the gripping device 90 is engaged with the noise reduction structure 30''' prior to it being drawn within the driveshaft tube 18. Then, the plug 91 is disposed within the reducing sleeve 61, and the source of vacuum 70 is operated. As a result, the plug 91 and the noise reduction structure 30''' are drawn within the driveshaft tube 18. The use of the plug 91 allows the source of vacuum 70 to generate a sufficient pressure differential to draw the noise reduction structure 30''' within the driveshaft tube 18. Once the noise reduction structure 30''' has been installed, the gripping device 90 can be removed from the driveshaft tube 18. Alternatively, the gripping device 90 can be left within the driveshaft tube 18 if desired.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A method of installing a noise reduction structure within a tube comprising the steps of:

(a) providing a tube having an inner surface defining an inner cross sectional dimension;

(b) providing a noise reduction structure having an outer surface defining an outer cross sectional dimension that is larger than the inner cross sectional dimension defined by the tube;

(c) disposing the noise reduction structure adjacent to the tube; and (d) generating a vacuum in the tube to draw the noise reduction structure within the tube.

2. The method defined in claim 1 wherein said step (a) is performed by providing a tube that is generally hollow and cylindrical in shape.

3. The method defined in claim 1 wherein said step (a) is performed by providing a tube that is generally hollow and cylindrical in shape, including a center portion that defines a first inner cross sectional dimension and a pair of end portions that define a second inner cross sectional dimension that is smaller than the first inner cross sectional dimension.

4. The method defined in claim 1 wherein said step (b) is performed by providing a noise reduction structure that is formed from a compressible material.

5. The method defined in claim 1 wherein said step (c) is performed by disposing one end of the noise reduction structure adjacent to one end of the tube.

6. The method defined in claim 1 wherein said step (c) is performed by disposing a reducing sleeve adjacent to the tube and disposing the noise reduction structure adjacent to the reducing sleeve.

7. The method defined in claim 1 wherein said step (c) is performed by (1) providing a reducing sleeve including an inner surface that extends from a first end defining a relatively larger inner cross sectional dimension to a second end defining a relatively smaller cross sectional dimension, (2) disposing the second end of the reducing sleeve adjacent to the tube, and (3) disposing the noise reduction structure adjacent to the first end of the reducing sleeve.

8. The method defined in claim 1 wherein said step (c) is performed by (1) applying a permeability reducing device to a portion of the noise reduction structure, and (2) disposing the permeability reducing device adjacent to the tube.

9. The method defined in claim 8 wherein said step (c)(1) is performed by applying a barrier piece to a portion of the noise reduction structure.

10. The method defined in claim 8 wherein said step (c)(1) is performed by applying a barrier cup to a portion of the noise reduction structure.

11. The method defined in claim 8 wherein said step (c)(1) is performed by applying a gripping device to a portion of the noise reduction structure.

12. The method defined in claim 1 wherein said step (d) is performed by disposing a source of vacuum adjacent to the tube.

13. The method defined in claim 1 including the further step of discontinuing the generation of vacuum when the noise reduction structure is located at a predetermined position within the tube.

14. The method defined in claim 1 wherein said step (d) is performed by (1) disposing a source of vacuum including a limit switch adjacent to the tube, and (2) discontinuing the generation of vacuum when the noise reduction structure engages the limit switch.

15. The method defined in claim 1 including the further step of venting the tube when the noise reduction structure is located at a predetermined position within the tube.

16. The method defined in claim 1 wherein said step (d) is performed by (1) disposing a source of vacuum including a limit switch adjacent to the tube, and (2) venting the tube when the noise reduction structure engages the limit switch.

17. The method defined in claim 1 including the further steps of discontinuing the generation of vacuum and venting the tube when the noise reduction structure is located at a predetermined position within the tube.

18. The method defined in claim 1 wherein said step (d) is performed by (1) disposing a source of vacuum including a limit switch adjacent to the tube, (2) discontinuing the generation of vacuum when the noise reduction structure engages it the limit switch of said source of vacuum, and (3) venting the tube when the noise reduction structure engages the limit switch.

* * * * *